DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 9

T949,007

RUBBER RECLAIMING PROCESS AND PRODUCT

Grant Crane and Edward Leo Kay, Akron, Ohio, assignors to The Firestone Tire & Rubber Company, Akron, Ohio

Continuation of abandoned application Ser. No. 528,532, Nov. 29, 1974, which is a continuation of abandoned application Ser. No. 365,383, May 30, 1973. This application Sept. 10, 1975, Ser. No. 611,949.

Int. Cl.[2] C08J *11/04*

U.S. Cl. 260—2.3

No Drawing. 14 Pages Specification

Scrap vulcanized rubber is converted into a soluble reclaimed rubber by heating with a volatile aromatic hydrocarbon at 400° to 700° F. for 0.1 to 50 hours. From 2 to 900 parts by weight of rubber per 100 parts of the hydrocarbon are used, and substantially all of the aromatic hydrocarbon is removed, after treatment, by distillation. The soluble reclaim is incorporated into new elastomeric products.